US009259025B2

(12) United States Patent
Diguet et al.

(10) Patent No.: US 9,259,025 B2
(45) Date of Patent: Feb. 16, 2016

(54) FORTIFICATION OF SUGAR WITH VITAMIN A

(75) Inventors: Sylvain Diguet, Hagenthal-le-haul (FR); Georg Steiger, Vienna (AT); Torsten Wieprecht, Schopfheim (DE)

(73) Assignee: DSM IP ASSETS B.V., Heerlen (NL)

( * ) Notice: Subject to any disclaimer, the term of this patent is extended or adjusted under 35 U.S.C. 154(b) by 1545 days.

(21) Appl. No.: 12/663,767

(22) PCT Filed: Jun. 10, 2008

(86) PCT No.: PCT/EP2008/004600
§ 371 (c)(1),
(2), (4) Date: May 28, 2010

(87) PCT Pub. No.: WO2009/000404
PCT Pub. Date: Dec. 31, 2008

(65) Prior Publication Data
US 2010/0255154 A1    Oct. 7, 2010

(30) Foreign Application Priority Data

Jun. 22, 2007  (EP) .................... 07012293

(51) Int. Cl.
| | |
|---|---|
| *A23L 1/30* | (2006.01) |
| *A23L 1/303* | (2006.01) |
| *A23D 7/005* | (2006.01) |
| *A23L 1/00* | (2006.01) |
| *A23L 1/0522* | (2006.01) |
| *A23L 1/302* | (2006.01) |
| *A23L 1/304* | (2006.01) |
| *A23L 2/39* | (2006.01) |
| *C13B 50/00* | (2011.01) |

(52) U.S. Cl.
CPC ............ *A23L 1/303* (2013.01); *A23D 7/0053* (2013.01); *A23L 1/0047* (2013.01); *A23L 1/05223* (2013.01); *A23L 1/302* (2013.01); *A23L 1/304* (2013.01); *A23L 2/39* (2013.01); *C13B 50/002* (2013.01); *A23V 2002/00* (2013.01)

(58) Field of Classification Search
USPC ......................................................... 426/73
See application file for complete search history.

(56) References Cited

FOREIGN PATENT DOCUMENTS

| | | |
|---|---|---|
| CA | 2 313 339 | 1/2001 |
| JP | 2003-339400 | 12/2003 |
| WO | WO 2007/012704 | 2/2007 |

OTHER PUBLICATIONS

Akosman: Determination of Drying Charicteristics and Effective Diffusivity for Sugar Cubes; Chem. Eng. Technol. 2004, 27. No. 11.*
Adhikari: Effect of addition of maltodextrin on drying kinetics and stickiness of sugar and acid-rich foods during convective drying: experiments and modelling; Journal of Food Engineering 62 (2004) 53-68.*
Lauriston: http://web.archive.org/web/20000925235030/http://www.brewery.org/brewery/library/GelTemps_RL0796.html; published Jan. 2000.*
Machine translation of WO/2007/012704, published Jan. 2007.*
Sasia: WO2007/012704 A1; filed 2005.*
International Search Report for PCT/EP2008/004600, mailed Mar. 19, 2009.
Derwent Abstract, "prodn. of lump sugar—involves final treatment of product with mixt. of ascorbic acid and additional starch paste to improve properties", (Jan. 1, 1990), 1 page.
WPI Week 200361 Abstract, Accession No. 2003-646713, (Apr. 30, 2003), 2 pages.
Arroyave, G. et al., "Fortification of sugar with vitamin A. Method for the quantitative determination of retinol in white table sugar", Archivos Latinoamericanos De Nutricion, vol. 24, No. 1, (Jan. 1, 1974), pp. 147-153.

* cited by examiner

*Primary Examiner* — Patricia George
(74) *Attorney, Agent, or Firm* — Nixon & Vanderhye P.C.

(57) ABSTRACT

Sugar premix containing crystal sugar particles comprising a sugar core which is coated with a mixture of one or more polysaccharides and/or one or more oligosaccharides said coating further containing one or more nutrients, processes for their manufacture and uses.

22 Claims, No Drawings

FORTIFICATION OF SUGAR WITH VITAMIN A

This application is the U.S. national phase of International Application No. PCT/EP2008/004600 filed 10 Jun. 2008, which designated the U.S. and claims priority to Europe Application No. 07012293.2 filed 22 Jun. 2007, the entire contents of each of which are hereby incorporated by reference.

The present invention relates to a process for the fortification of (crystal) sugar with nutrients, especially to a process for the fortification of (crystal) sugar with vitamin A, furthermore it relates to a fortified sugar premix obtainable by said process and the fortified (bulk) sugar.

Vitamins and/or mineral nutrient deficiency, in particular vitamin A deficiency continues to be highly prevalent in developing countries. The World Health Organization (WHO) estimates that in at least 75 countries, the vitamin A deficiency is a problem of public health importance. Of the many approaches that have been taken to control vitamin and/or mineral nutrient deficiency, sugar fortification seems to be one of the most effective, as sugar fulfils in most countries the criteria which marks it a good vehicle for fortification with specific nutrients, such as:

- being consumed in significant amounts by essentially all members of the targeted groups of the population whereby the daily intake is essentially constant;
- not causing any imbalance of essential nutrients;
- There is reasonable assurance that no excess intake will be induced;
- Fortification does not alter the organoleptic characteristics of the vehicle;

Accordingly especially vitamin A fortification of sugar has been done since several decades in various countries. The fortification of sugar is often carried out in two steps.

In a first step, a concentrated premix which contains vitamin A, an unsaturated oil and/or fat as a binder and an antioxidant to prevent peroxidation of the oil is prepared by simple mixing. Most often retinyl palmitate is used, e.g. as a microencapsulated powdery preparation that contains a defined amount of vitamin A per gram and is water-dispersible. To avoid separation and inhomogeneity the nutrient (here vitamin A) has to be fixed on the outside of the sugar crystal. This is achieved by the oil and/or fat which makes the sugar surface sticky so that finally a sugar/vitamin/oil agglomerate (in form of a concentrated premix) is created.

The concentration of vitamin A in the premix is usually 1,000 times that of the final fortified sugar, which must accordingly be diluted with more sugar up to 1,000-fold. The premix is formulated to contain a 10% excess of vitamin A to correct for possible losses during the process.

The procedure described above for the fortification of sugar is based on technology developed in the early 1970s and modified as needed over the following years. Problems that are generally encountered with this technology relate to poor conditions of preparation of premixes, low-quality oils with a high content of peroxides, and poor storage conditions of the fortified sugar. The result, in spite of the use of antioxidants, is the slow development of rancidity of the added oil.

A further specific problem of the fortification of crystal sugar is that during and after addition of the premix to the bulk sugar a part of the nutrient which was already fixed on the sugar surface is removed from it resulting in separation and homogeneity problems.

Adding more oil and/or fat to the premix does not solve this problem because if more oil/fat is added to the premix, the flowability of the premix is reduced which leads to difficulties with the incorporation of said premix in the sugar bulk causing also inhomogeneity problems. Furthermore the development of rancidity is enlarged when using more oil/fat.

It was therefore an object of the following invention to provide a sugar premix containing one or more nutrients wherein in a preferred case it should be possible to add the premix to a sugar bulk whereby no separation and/or homogeneity problems should occur. Furthermore the resulting fortified sugar should satisfy the usual demands of a food composition, such as being stable against rancidity and/or oxidation, being and staying evenly distributed in the product over time and so on.

It has surprisingly been found that the object of the present invention is achieved by a sugar premix containing crystal sugar particles comprising a sugar core which is coated with a mixture of one or more polysaccharides and/or one or more oligosaccharides said coating further containing one or more nutrients.

It was not to be foreseen by the person skilled in the art that a sugar premix according to the present invention would solve the above mentioned issues.

The terms "sugar" and "crystal sugar" as used herein refer to commercially-produced "table sugar", which most commonly comes either from sugar-cane or from sugar-beet, including sugars in all degrees of purity and color ranging from raw sugar (brown sugar) to refined sugar (white sugar). Table sugar consists mainly of sucrose (also called saccharose).

The term "polysaccharide" as used herein includes xanthan gum, acacia gum, pectins, guar, caroub gums, alginates, celluloses, cellulose derivatives, such as carboxymethylcellulose, and/or modified polysaccharides, such as starch and starch derivatives. Preferred polysaccharides according to the present invention are acacia gum, starch, starch derivatives; especially preferred are gelatinized starch and modified food starch.

Gelatinized starch can be produced by various techniques. Usually the production process includes a heating step under humid conditions, whereas the starch source may vary: e.g. wheat, rice, potato and/or corn, the starch preferably containing more than 50% by weight Amylopectin and less than 50% by weight Amylose. One advantageous gelatinized starch is produced by an extrusion process and then dried to a water content of less than 10% by weight; it is e.g. commercialized under the trade name "Suprex 160" of Codrico BV, NL.

The term "modified food starch" as used herein relates to modified starches that are made from starches substituted by known chemical methods with hydrophobic moieties. For example starch may be treated with cyclic dicarboxylic acid anhydrides such as succinic and/or glutaric anhydrides, substituted with an alkyl or alkenyl hydrocarbon group.

A particularly preferred modified starch of this invention has the following formula (I)

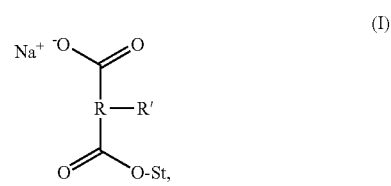

(I)

Wherein St is a starch, R is an alkylene radical and R' is a hydrophobic group. Preferably R is a lower alkylene radical such as dimethylene or trimethylene. R' may be an alkyl or alkenyl group, preferably having 5 to 18 carbon atoms. A preferred modified starch of formula (I) is starch sodium octenyl succinate ("OSA-starch"). The term "OSA-starch" as used herein denotes any starch (from any natural source such as corn, wheat, tapioca, potatoe or synthesized) that was treated with octenyl succinic anhydride (OSA). The degree of substitution, i.e. the number of esterified hydroxyl groups with regard to the total number of hydroxyl groups usually varies in a range of from 0.1% to 10%, preferably in a range of from 0.5% to 5%, more preferably in a range of from 2% to 4%.

OSA-starches may contain further hydrocolloids, such as starch, maltodextrin, carbohydrates, gum, corn syrup etc. and optionally any typical emulsifier (as co-emulgator), such as mono- and diglycerides of fatty acids, polyglycerol esters of fatty acids, lecithins, sorbitan monostearate, plant fiber and/or sugar.

OSA-starches are commercially available e.g. from National Starch under the trade names HiCap 100, Capsul, Capsul HS, Purity Gum 2000, UNI-PURE, HYLON VII; from Roquette Frères; from CereStar under the tradename C*EmCap or from Tate & Lyle. HiCap 100, Capsul and Capsul HS are especially preferred.

According to the present invention starch hydrolysates, such as dextrins and maltodextrins, are preferred oligosaccharides. Maltodextrins are especially preferred.

The term "nutrient" as used herein denotes physiologically essential components of the human diet such as vitamins, e.g., vitamin A, vitamin B1, Folic acid, Niacin, vitamin B12, vitamin B2, vitamin B6, vitamin E, C, Biotin, Pantothenates, vitamin K, vitamin D as well as derivatives and mixtures of these, as well as minerals and trace elements such as Iron, Selenium, Zinc and Calcium.

Vitamin A and/or retinyl esters, such as e.g. retinyl palmitate and/or retinyl acetate are especially preferred.

According to the present invention it is advantageous if the amount of nutrients present in the sugar premix is sufficient to provide about 50% to 5000% of the RDA (Recommended Daily Allowance for an adult) in 1 g premix.

The nutrients are usually added in a powdery form, i.e. oily vitamins like vitamin A or vitamin E are preferably used as powdery product forms (e.g. as adsorbates, spray dried powders or beadlets which may contain further ingredients, like matrix components—e.g. hydrocolloids—antioxidants, plasticizers, and/or emulsifiers). Even more preferred are water-dispersible powdery product forms of these vitamins. Water-dispersible powdery retinyl palmitate and/or retinyl acetate are especially preferred.

It is according to the present invention especially preferred to use a water-dispersible powdery retinyl palmitate form with an activity of 250 000 IU/g. In this case it is according to the present invention advantageous if the amount of said retinyl palmitate is in the range 2 500 000 IU to 150 000 000 IU, most preferred 25 000 000 IU to 75 000 000 IU, each based on 1 kg of the sugar premix.

There exist various ways to produce the sugar premix according to the present invention.

Accordingly a further object of the present invention is a process for the manufacture of a sugar premix containing crystal sugar particles comprising the steps of
a) dissolving one or more polysaccharides and/or one or more oligosaccharides in water thus forming a glue;
b) mixing the glue of step a) with sugar in order to coat said sugar with said glue;
c) adding one or more nutrients to the mixture of step b);
d) if necessary drying the product of step c) until said product has a water content of less than 3% by weight and
e) optionally sieving and/or milling the so-derived sugar premix.

Step a) of this process can be conducted at any reasonable temperature to ensure a rapid dissolution of the polysaccharide(s) and/or oligosaccharide(s) in water. Dissolving in water of a temperature from to about 20 to 60° C. is preferable.

In another embodiment of the present invention the process for the manufacture of a sugar premix containing crystal sugar particles comprises the steps of
a) mixing one or more polysaccharides and/or one or more oligosaccharides with sugar;
b) spraying water on the mixture of step a) in order to form a glue;
c) adding one or more nutrients to the mixture of step b);
d) if necessary drying the product of step c) until said product has a water content of less than 3% by weight and
e) optionally sieving and/or milling the so-derived sugar premix.

In yet another embodiment of the present invention the process for the manufacture of a sugar premix containing crystal sugar particles comprises the steps of
a) mixing one or more polysaccharides and/or one or more oligosaccharides with sugar and one or more nutrients;
b) spraying water on the mixture of step a) in order to form a nutrient containing coating on the sugar;
c) if necessary drying the product of step b) until said product has a water content of less than 3% by weight and
d) optionally sieving and/or milling the so-derived sugar premix.

If the sugar premix of the present invention is obtained by one of the processes 1 to 3 as described above it is advantageous if the amount of polysaccharides and/or oligosaccharides (one or more compounds) in the sugar premix is in the range of from 0.1 to 5% by weight, preferably from 0.5 to 4% by weight, more preferably from 1 to 3% by weight each based on the total weight of the sugar premix (i.e. before an optional drying step is carried out).

In these cases the amount of water used in a process according to the present invention (whereby the water is mainly needed to form the glue) is usually in the range of from 1 to 10% by weight, preferably from 1 to 8% by weight, more preferably from 3 to 5% by weight, each based on the total weight of the sugar premix.

The sugar premix of the present invention is further obtainable by a process using the nutrient in form of a microencapsulated powdery preparation that contains a defined amount of the nutrient per gram, further containing one or more matrix materials (in the following called microencapsulated nutrient). Preferred microencapsulated nutrients are water-dispersible beadlets and/or spray-dried emulsions containing the nutrient.

The term "beadlet" as used herein refers to small discrete particles, which have a mean particle size of 50-1000 µm in diameter and are usually nearly spherical. Beadlets contain one or more active ingredients in an encapsulated form.

Beadlets are obtained when an emulsion or suspension consisting of small lipophilic droplets of an active ingredient dispersed in an aqueous matrix phase, is dried. The lipophilic droplets and/or the matrix can contain further ingredients, like antioxidants, plasticizers, and emulsifiers.

Antioxidants prevent oxidation of the active ingredients, thus preserving the desired properties of the actives, such as biological activity, color and/or color intensity. Typical antioxidants are vitamin E, vitamin C, ascorbyl palmitate, 2,6- di-tert-butyl-p-cresol (butylated hydroxytoluene or BHT), butylated hydroxyanisole (BHA), ethoxyquin (EMQ), and others.

Plasticizers are used in order to modulate the mechanical properties of the matrix. Thus flexibility, softness, elasticity, and compressibility can be controlled.

Typical plasticizers are sucrose, inverted sucrose, glycerol, sorbitol, glucose syrup, polyethylene glycol, and others).

Emulsifying agents are necessary during the preparation of an emulsion/suspension in order to lower the interface tension between the lipophilic active ingredient and the aqueous matrix. After formation of the emulsion/suspension the emulsifying agents stabilize the small lipophilic droplets dispersed in the aqueous phase.

As emulsifying agents either low molecular weight emulsifiers (lecithins, sugar esters, polyglycerol esters, polysorbates, and any other emulsifier suitable for that purpose) or macro-molecules like hydrocolloids (gelatins, proteins, starches, pectins, gum acacia, lignosulfonates, and any other macro-molecule suitable for that purpose) or a mixture of these two types can be applied. Macro-molecules can additionally stabilize the droplets sterically.

The properties of the emulsifying agents have to be chosen properly, in order to achieve the best stabilization of the small lipophilic droplets.

Beadlets are formed during the drying step, i.e. beadlets are solid and contain small lipophilic droplets with the active ingredient embedded in the matrix formed of solid components, whereby the lipophilic droplets are homogeneously distributed in the matrix. The typical size of the lipophilic droplets is in the range of 1 to 1000 nm, preferably below 300 nm.

The drying of said emulsion or suspension can be carried out by different processes. If a powder catch process is applied, the beadlets further contain a layer of the capturing media on the surface. This layer leads to a rough surface of the beadlets. The capturing media is often starch, silicates or phosphates.

If the beadlets are dispersed in water, the components of the matrix are dissolved, whereas the lipophilic droplets with the active ingredient remain unchanged, i.e., the original emulsion or suspension with its small particle size (1 to 1000 nm, preferably below 300 nm) is reconstituted. The high bioavailability and coloring strength of a nano-emulsion or nano-suspension is therefore maintained.

Accordingly in a fourth embodiment of the present invention the process for the manufacture of a sugar premix containing crystal sugar particles comprises the steps of
a) dissolving one or more microencapsulated nutrients and one or more polysaccharides or/and one or more oligosaccharides in water in order to form an emulsion and/or dispersion;
b) fluidising the sugar;
c) spraying the emulsion and/or dispersion of step a) in order to form a nutrient containing coating on the sugar;
d) optionally—if necessary—drying the product of step c) until said product has a water content of less than 3% by weight and
e) optionally sieving and/or milling the granules of step d).

In a fifth embodiment of the present invention the process for the manufacture of a sugar premix containing crystal sugar particles comprises the steps of
a) preparing an emulsion and/or dispersion of one or more microencapsulated nutrients, wherein the nutrients are microencapsulated in one or more polysaccharides or/and one or more oligosaccharides, in water
b) fluidising the sugar;
c) spraying the emulsion and/or dispersion of step a) in order to form a nutrient containing coating on the sugar;
d) optionally—if necessary—drying the product of step c) until said product has a water content of less than 3% by weight and
e) optionally sieving and/or milling the granules of step d).

In a sixth embodiment of the present invention the process for the manufacture of a sugar premix containing crystal sugar particles comprises the steps of
a) preparing an emulsion and/or dispersion one or more oligosaccharides in water
b) fluidising the sugar and one or more microencapsulated nutrients;
c) spraying the emulsion and/or dispersion of step a) in order to form a nutrient containing coating on the sugar;
d) optionally—if necessary—drying the product of step c) until said product has a water content of less than 3% by weight and
e) optionally sieving and/or milling the granules of step d).

If the sugar premix of the present invention is obtained by one of the processes 4 to 6 as described above it is advantageous if the amount of polysaccharides and/or oligosaccharides (one or more compounds) in the sugar premix is in the range of from 10 to 20% by weight, preferably from 10 to 15% by weight, each based on the total weight of the sugar premix (i.e. before an optional drying step is carried out).

According to the present invention it is further preferred if the residual water content in the final sugar premix (which normally is the merchandise) is below 3 weight-%, preferably below 1 weight-%, each based on the total weight of the final sugar premix, especially if the final sugar premix or the fortified sugar bulk are intended to be stored for a longer period of time (up to several years).

In this regard it does not make any difference if the residual water content is obtained by carrying out the drying step or if it is obtained because the amount of water used to form the glue was chosen so that residual water content is already below 3 weight-%, preferably below 1 weight-%, each based on the total weight of the final sugar premix.

The water content of the final sugar premix according to the present invention may be determined by Karl Fischer titration (e.g. described in Eugen Scholz *Karl-Fischer-Titration*, Springer-Verlag 1984 or the WHO Method WHO/M/7.R1)

According to the present invention it is preferred to carry out the optional drying step. Any conventional drying process known to the person skilled in the art may be used, preferred is drying in a fluid-bed dryer. The drying is preferably done at temperatures below 80° C., more preferably below 60° C.

In further embodiments of the processes of the present invention a separate drying of the sugar premix is not necessary, because the premix is added to the bulk sugar during its production, especially during the drying step of production of the bulk sugar.

In preferred embodiments of the processes of the present invention one or more flow-conditioning agents (also referred to as anti-caking or drying agents or flow enhancers) are added to the sugar premix before or during the drying step. It may also be advantageous to add one or more flow-conditioning agents if a drying step is not carried out.

Preferred flow-conditioning agents are for example (hydrophilic) fumed silica—such as those commercially available under the trade name AEROSIL® from Degussa—and/or silicon dioxide, e.g. "Sipernate 22S" of Degussa.

According to the present invention it is advantageous if the amount of flow-conditioning agent(s) (one or more compounds) in the powder is in the range of from 0.1 to 0.5% by weight when silica is used and in the range of from 0.02 to 0.5% by weight when silicon dioxide is used, each based on the total weight of the sugar premix.

In preferred embodiments of the processes of the present invention antioxidants (fat-soluble or water-soluble) are added to the sugar premix.

Preferred water-soluble antioxidants are for example ascorbic acid or salts thereof, preferably sodium ascorbate. Preferred fat-soluble antioxidants are for example tocopherol (synthetic or natural); butylated hydroxytoluene (BHT); butylated hydroxyanisole (BHA); propyl gallate; tert. butyl hydroxyquinoline and/or ascorbic acid esters of a fatty acid, preferably ascorbyl palmitat and/or ascorbyl stearate. dl-Tocopherol is especially preferred.

It is according to the present invention further preferred to add the antioxidants (one or more components) to the sugar premix via the powdery product form of the used nutrient(s). In this case no further antioxidants need to be added to the premix.

According to the present invention it is advantageous if the amount of antioxidant(s) (one or more compounds) in the suspension is in the range of from 0.1 to 2% by weight, preferably from 0.5 to 1.5% by weight, each based on the total weight of the sugar premix.

The desired mean particle size of the premix particles is advantageously similar to mean particle size of the bulk sugar. It may therefore be advantageous to sieve and/or mill the sugar premix in order to get the desired particle size. If a milling step is desired it is preferably carried out with a commercially available ball mill or with an oscillating sieve mill. The preferred milling parameters may differ depending on the mill used in the milling step, but can easily be adjusted by the person skilled in the art through no inventive fault of his own.

The present invention is also directed to bulk sugar containing crystal sugar particles comprising a sugar core which is coated with a mixture of one or more polysaccharides and/or one or more oligosaccharides said coating further containing one or more nutrients. Said bulk sugar can be produced the by adding a sugar premix to a sugar bulk, normally in a ratio of about 1:1000, whereby the ratio might vary between 1:100 to 1:10000.

The present invention is further directed to a food composition, especially to an instant beverage containing crystal sugar particles comprising a sugar core which is coated with a mixture of one or more polysaccharides and/or one or more oligosaccharides said coating further containing one or more nutrients. The term "instant beverage" as used herein relates to a dry, powdery composition to which upon its use water or another liquid beverage composition (such as milk, juice and so on) can or has to be added. Effervescent tablets are also part of this invention.

The sugar premix and/or the bulk sugar according to the present invention can be used to produce a food composition or a beverage. The beverage may be a base composition to which upon its use water or another liquid beverage composition (such as milk, juice and so on) can or has to be added. The base composition can also be prepared as a concentrate to which water or another liquid beverage composition has to be added, or as a beverage to which no liquid needs to be added.

The amount of sugar premix and/or bulk sugar according to the present invention which is to be added to a food composition depends on the potency of said sugar premix and/or bulk sugar, i.e. the amount of nutrient(s) in the sugar premix and/or bulk sugar.

The invention is further illustrated by the following examples.

EXAMPLES

Example 1

| | |
|---|---|
| Sugar | 828 g |
| Water | 35 g |
| Suprex Wheat 160 | 14.5 g |
| Vitamin A 250 s/n | 122.5 g |

Sugar and water are mixed carefully (5 minutes)
Suprex Wheat 160 is added and continuously mixed
After several minutes the Vitamin A 250 is added and mixed until homogeneous
The wet powder mix is dried at 40-50° C. in a fluid bed dryer until water content <1%
Sifting/cracking of granules

Example 2

| | |
|---|---|
| Sugar | 750 g |
| Water | 20 g |
| Maltodextrin | 30 g |
| Vitamin A 250 s/n | 200 g |

Maltodextrin is dissolved in water at room temperature
The solution is added to the sugar and mixed
After 2 minutes the Vitamin A 250 s/n is added and mixed until homogeneous
The wet powder mix is dried at 60-70° C. in a fluid bed dryer until water content <1%
followed by sifting (through 1.25 mm) of the granulate

Example 3

| | |
|---|---|
| Sugar | 750 g |
| Water | 40 g |
| *Acacia* gum | 10 g |
| Vitamin A 250 s/n | 200 g |

Acacia gum is dissolved in water at room temperature
The solution is added to the sugar and mixed
After 2 minutes the Vitamin A 250 s/n is added and mixed until homogeneous
The wet powder mix is dried at 60-70° C. in a fluid bed dryer until water content <1%
followed by sifting (through 1.25 mm) of the granulate

Example 4

Emulsion Process Lab Scale 500 g of Dry vitamin A palmitate 250 S/N is dissolved in 500 g room temperature deionised water under agitation with ultraturrax (11000 rpm). 1500 g of fine crystalline beet sugar is fluidized in an Aeromatic MP-1 fluid bed with 80 m³/h air having an inlet temperature of 80° C. 848 g of the solution of vitamin is sprayed at a rate in the range of 15-25 g/min. The product is then dried 10 minutes with an inlet air temperature of 65° C.

The product obtained has the following properties:
Initial content (UV): 57705 iU/g
Particle size:
>850 μm: 5.4% by weight
>600 μm: 32.6% by weight
<150 μm: 1.3% by weight
Water content: 0.69% by weight Example 5

Emulsion Process Pilot Scale 9.82 kg of Dry vitamin A palmitate 250 S/N is dissolved in 9.82 kg 50° C. deionised water under good agitation within 1 hour. The obtained emulsion has an inner phase size between 100 and 300 nanometers and a viscosity in the range 100-300 mPa·s at 50° C. 30 kg of fine crystalline cane sugar is fluidized in an Glatt GPC 15/30 fluid bed with 1400 m³/h air having an inlet temperature of 70° C. 17.1 kg of the solution of vitamin is sprayed at a rate is the range of 14-15 kg/h. The product is then cooled to 20-30° C. with 15-20° C. air temperature. The product is then milled in an oscillating sieve mill (Freywitt) with an 800 μm sieve.

The product obtained has the following properties:
Initial content (UV): 64500 iU/g
Particle size:
>850 μm: 0.2% by weight
>600 μm: 14.8% by weight
<150 μm: 3.3% by weight
Water content: 1.0% by weight Example 6 and 7

Emulsion Process Pilot Scale

TABLE 2

| samples of pilot trials | | |
|---|---|---|
| Example | 6 | 6 |
| sugar type | beet | cane |
| $d_{50}$ (Malvern) | 494 μm | 491 μm |
| Vit. A content | 64'700 IU/g | 62'100 IU/g |
| sieve | (% by weight) | (% by weight) |
| >850 μm | 0.0% | 0.0% |
| 600-850 μm | 14.6% | 23.0% |
| 150-600 μm | 80.3% | 70.8% |
| <150 μm | 5.1% | 6.1% |
| water content | 0.9% | 1.1% |

The spray solution was prepared dissolving 5.79 kg maltodextrin in 13.52 kg water at room temperature in between 60 min. The viscosity of the solution was 14-18 mPas (25° C.).

30 kg of sugar and 9.81 kg Dry Vitamine A-Palmitate 250 S/N (DSM Nutritional Products Ltd) were loaded to the fluid bed granulator and fluidized with 700-800 m³/h at 80° C. The spraying starts immediately (1.2 mm nozzle, 4 bar atomization air pressure). The spray rate was set to 5 kg/h at the beginning of spraying to 15-20 kg/h at the main spraying phase. The water content (sample out of fluid bed) was 1.5-2.5% (LOD) to reach a good agglomeration between the sugar crystals and the Dry Vitamine A-Palmitate 250 S/N particles and to avoid immoderate agglomeration between the sugar crystals itself. The spray rate has to be adjusted to guarantee water content of 1.5-2.5% by weight (LOD). The inlet air temperature has to be adjusted to keep the product temperature between 50-60° C.

When 14.9 kg of the spray solution was sprayed the spraying process was stopped and the product was dried to a water content <1.0% (LOD). While drying the inlet air temperature has to be adjusted to hold a product temperature of 50-60° C. After drying the product was cooled to 30° C. by reducing the inlet air temperature to 15-20° C.

The spraying process in the fluid bed granulator needs app. 70 min. The drying process needs app. 40 min. The cooling process needs app. 10 min.

The product was milled in an oscillating sieve mill (Frewitt) with an 850 μm (mesh 20) sieve and than packed and sealed in alu-bags.

The invention claimed is:

1. A sugar premix containing:
   crystal sugar particles, wherein the crystal sugar particles comprise:
   a sugar core, and
   a coating surrounding the sugar core, wherein the coating comprises a mixture comprised of
      (1) one or more polysaccharides and/or one or more oligosaccharides, and
      (2) one or more nutrients.

2. A sugar premix according to claim 1, wherein the polysaccharide is selected from xanthan gum, acacia gum, pectins, guar, caroub gums, alginates, celluloses, cellulose derivatives and/or modified polysaccharides.

3. A sugar premix according to claim 1, wherein the one or more polysaccharides comprise a polysaccharide which is selected from the group consisting of acacia gum, starch, and starch derivatives.

4. A sugar premix according to claim 1, wherein the one or more polysaccharides comprise is a gelatinized starch.

5. A sugar premix according to claim 1, wherein the one or more polysaccharides comprise a modified food starch.

6. A sugar premix according to claim 1, wherein the one or more oligosaccharides comprise a starch hydrolysate.

7. A sugar premix according to claim 6, wherein the starch hydrolysate is selected from dextrins and maltodextrins.

8. A sugar premix according to claim 6, wherein the starch hydrolysate is a maltodextrin.

9. A sugar premix according to claim 1, wherein the nutrient is selected from the group consisting of vitamin A, vitamin B1, Folic acid, Niacin, vitamin B12, vitamin B2, vitamin B6, vitamin E, C, Biotin, Pantothenates, vitamin K, vitamin D and derivatives and mixtures thereof.

10. A sugar premix according to claim 1, wherein the nutrient is selected from the group consisting of vitamin A and retinyl esters.

11. A sugar premix according to claim 1, wherein the nutrient is retinyl palmitate.

12. A sugar premix according to claim 1, wherein the sugar premix has a water content which is below 3 weight percent based on total weight of the sugar premix.

13. A process for manufacture of the sugar premix according to claim 1, comprising the steps of:
   a) dissolving one or more polysaccharides and/or one or more oligosaccharides in water thus forming a glue;
   b) mixing the glue of step a) with sugar in order to coat said sugar with said glue;
   c) adding one or more nutrients to the mixture of step b);
   d) optionally drying the product of step c) until said product has a water concentration of less than 3% by weight; and
   e) optionally sieving and/or milling the granulate of step d).

14. A process for manufacture of the a sugar premix according to claim 1, comprising the steps of:

a) mixing one or more polysaccharides and/or one or more oligosaccharides with sugar;
b) spraying water on the mixture of step a) in order to form a glue;
c) adding one or more nutrients to the mixture of step b);
d) optionally drying the product of step c) until said product has a water concentration of less than 3% by weight; and
e) optionally sieving and/or milling the granulate of step d.

15. A process for manufacture of a sugar premix according to claim 1, comprising the steps of:
a) mixing one or more polysaccharides and/or one or more oligosaccharides with sugar and one or more nutrients;
b) spraying water on the mixture of step a);
c) optionally drying the product of step b) until said product has a water concentration of less than 3% by weight: and
d) optionally sieving and/or milling the granulate of step d).

16. A process for manufacture of a sugar premix according to claim 1, comprising the steps of:
a) dissolving one or more microencapsulated nutrients and one or more polysaccharides and/or one or more oligosaccharides in water in order to form an emulsion and/or dispersion;
b) fluidising the sugar;
c) spraying the emulsion and/or dispersion of step a) in order to form a nutrient containing coating on the sugar;
d) optionally drying the product of step c) until said product has a water content of less than 3% by weight; and
optionally sieving and/or milling the granules of step d).

17. A process for manufacture of a sugar premix according to claim 1, comprising the steps of:
a) preparing an emulsion and/or dispersion of one or more microencapsulated nutrients, wherein the nutrients are microencapsulated in one or more polysaccharides and/or one or more oligosaccharides, in water;
b) fluidising the sugar;
c) spraying the emulsion and/or dispersion of step a) in order to form a nutrient containing coating on the sugar;
d) optionally drying the product of step c) until said product has a water content of less than 3% by weight; and
e) optionally sieving and/or milling the granules of step d).

18. A process for manufacture of a sugar premix according to claim 1, comprising the steps of:
a) preparing an emulsion and/or dispersion one or more oligosaccharides in water;
b) fluidising the sugar and one or more microencapsulated nutrients;
c) spraying the emulsion and/or dispersion of step a) in order to form a nutrient containing coating on the sugar;
d) optionally drying the product of step c) until said product has a water content of less than 3% by weight; and
e) optionally sieving and/or milling the granules of step d).

19. The process for manufacture of a sugar premix, according to claim 13, wherein the drying step is mandatory.

20. A bulk sugar containing:
sugar bulk; and
a sugar premix containing the crystal sugar particles according to claim 1,
wherein the crystal sugar particles to sugar bulk are in a ratio of from 1:100 to 1:10000.

21. A food, beverage and/or pharmaceutical preparation which comprises the sugar premix according to claim 1.

22. An instant beverage which comprises the sugar premix according to claim 1.

\* \* \* \* \*